United States Patent
Weising

(10) Patent No.: US 11,478,706 B2
(45) Date of Patent: *Oct. 25, 2022

(54) PLACEMENT OF USER INFORMATION IN A GAME SPACE

(71) Applicant: Sony Interactive Entertainment LLC, San Mateo, CA (US)

(72) Inventor: George Weising, Culver City, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,990

(22) Filed: Sep. 23, 2020

(65) Prior Publication Data

US 2021/0001224 A1    Jan. 7, 2021

Related U.S. Application Data

(63) Continuation of application No. 12/777,268, filed on May 11, 2010, now Pat. No. 10,786,736.

(51) Int. Cl.
    *A63F 13/5375*    (2014.01)
    *A63F 13/54*      (2014.01)
    *A63F 13/798*     (2014.01)

(52) U.S. Cl.
    CPC .......... *A63F 13/5375* (2014.09); *A63F 13/54* (2014.09); *A63F 13/798* (2014.09); *A63F 2300/305* (2013.01); *A63F 2300/306* (2013.01)

(58) Field of Classification Search
    None
    See application file for complete search history.

(56) References Cited

U.S. PATENT DOCUMENTS

| | | | |
|---|---|---|---|
| 3,147,341 A | 9/1964 | Gibson, Jr. | |
| 3,200,193 A | 8/1965 | Biggs et al. | |
| 3,717,345 A | 2/1973 | Banville | |
| 3,943,277 A | 3/1976 | Everly et al. | |
| 4,051,491 A | 9/1977 | Toyoda | |
| 4,051,520 A | 9/1977 | Davidse et al. | |

(Continued)

FOREIGN PATENT DOCUMENTS

| | | |
|---|---|---|
| BR | 112012028924 B1 | 2/2021 |
| CN | 1201180 A | 12/1998 |

(Continued)

OTHER PUBLICATIONS

International Preliminary Examination Report dated Dec. 15, 2003 in PCT Application No. PCT/US2002/026360.

(Continued)

*Primary Examiner* — Jason T Yen
(74) *Attorney, Agent, or Firm* — Carr & Ferrell LLP

(57) ABSTRACT

The generation, association, and display of in-game tags are disclosed. Such tags introduce an additional dimension of community participation to both single and multiplayer games. Through such tags, players are empowered to communicate through filtered text messages and images as well as audio clips that other game players, including top rated players, have generated and placed at particular coordinates and/or in context of particular events within the game space. The presently described in-game tags and associated user generated content further allow for label based searches with respect to game play.

19 Claims, 3 Drawing Sheets

(56) References Cited

U.S. PATENT DOCUMENTS

| | | |
|---|---|---|
| 4,068,847 A | 1/1978 | Lukkarila et al. |
| 4,090,216 A | 5/1978 | Constable |
| 4,116,444 A | 6/1978 | Mayer et al. |
| 4,133,004 A | 1/1979 | Fitts |
| 4,166,429 A | 9/1979 | Smorzaniuk |
| 4,166,430 A | 9/1979 | Johnson, Jr. |
| 4,203,385 A | 5/1980 | Mayer et al. |
| 4,241,341 A | 12/1980 | Thorson |
| 4,321,635 A | 3/1982 | Tsuyuguchi |
| 4,355,334 A | 10/1982 | Fitzgibbon et al. |
| 4,361,850 A | 11/1982 | Nishimura |
| 4,448,200 A | 5/1984 | Brooks et al. |
| 4,514,727 A | 4/1985 | Van Antwerp |
| 4,533,937 A | 8/1985 | Yamamoto et al. |
| 4,646,075 A | 2/1987 | Andrews et al. |
| 4,649,504 A | 3/1987 | Krouglicof et al. |
| 4,658,247 A | 4/1987 | Gharachorloo |
| 4,672,564 A | 6/1987 | Egli et al. |
| 4,675,562 A | 6/1987 | Herlein et al. |
| 4,677,569 A | 6/1987 | Nakano et al. |
| 4,683,466 A | 7/1987 | Holtey et al. |
| 4,685,054 A | 8/1987 | Manninen et al. |
| 4,685,146 A | 8/1987 | Fenster et al. |
| 4,709,231 A | 11/1987 | Sakaibara et al. |
| 4,727,365 A | 2/1988 | Bunker et al. |
| 4,737,921 A | 4/1988 | Goldwasser et al. |
| 4,757,525 A | 7/1988 | Matthews et al. |
| 4,764,727 A | 8/1988 | McConchie, Sr. |
| 4,807,158 A | 2/1989 | Blanton et al. |
| 4,817,005 A | 3/1989 | Kubota et al. |
| 4,843,568 A | 6/1989 | Krueger et al. |
| 4,860,197 A | 8/1989 | Langendorf et al. |
| 4,864,515 A | 9/1989 | Deck |
| 4,866,637 A | 9/1989 | Gonzalez-Lopez et al. |
| 4,901,064 A | 2/1990 | Deering |
| 4,905,147 A | 2/1990 | Logg |
| 4,905,168 A | 2/1990 | McCarthy et al. |
| 4,933,864 A | 6/1990 | Evans, Jr. et al. |
| 4,934,908 A | 6/1990 | Turrell et al. |
| 4,942,538 A | 7/1990 | Yuan et al. |
| 4,943,938 A | 7/1990 | Aoshima et al. |
| 4,952,917 A | 8/1990 | Yabuuchi |
| 4,956,794 A | 9/1990 | Zeevi et al. |
| 4,962,540 A | 10/1990 | Tsujiuchi et al. |
| 4,969,036 A | 11/1990 | Bhanu et al. |
| 4,980,823 A | 12/1990 | Liu |
| 4,991,223 A | 2/1991 | Bradley |
| 4,992,972 A | 2/1991 | Brooks et al. |
| 5,014,327 A | 5/1991 | Potter et al. |
| 5,034,986 A | 7/1991 | Karmann et al. |
| 5,045,843 A | 9/1991 | Hansen |
| 5,057,744 A | 10/1991 | Barbier et al. |
| 5,064,291 A | 11/1991 | Reiser |
| 5,067,014 A | 11/1991 | Bergen et al. |
| 5,128,671 A | 7/1992 | Thomas, Jr. |
| 5,128,794 A | 7/1992 | Mocker et al. |
| 5,162,781 A | 11/1992 | Cambridge |
| 5,194,941 A | 3/1993 | Grimaldi et al. |
| 5,208,763 A | 5/1993 | Hong et al. |
| 5,212,888 A | 5/1993 | Cary et al. |
| 5,222,203 A | 6/1993 | Obata |
| 5,227,985 A | 7/1993 | DeMenthon |
| 5,230,623 A | 7/1993 | Guthrie et al. |
| 5,253,339 A | 10/1993 | Wells et al. |
| 5,261,820 A | 11/1993 | Slye et al. |
| 5,265,888 A | 11/1993 | Yamamoto et al. |
| 5,268,996 A | 12/1993 | Steiner et al. |
| 5,269,687 A | 12/1993 | Mott et al. |
| 5,274,560 A | 12/1993 | LaRue |
| 5,297,061 A | 3/1994 | Dementhon et al. |
| 5,305,389 A | 4/1994 | Palmer |
| 5,307,137 A | 4/1994 | Jones et al. |
| 5,335,557 A | 8/1994 | Yasutake |
| 5,351,090 A | 9/1994 | Nakamura |
| 5,354,202 A | 10/1994 | Moncrief et al. |
| 5,361,147 A | 11/1994 | Katayama et al. |
| 5,363,120 A | 11/1994 | Drumm |
| 5,366,376 A | 11/1994 | Copperman et al. |
| 5,367,615 A | 11/1994 | Economy et al. |
| 5,369,737 A | 11/1994 | Gholizadeh et al. |
| 5,377,997 A | 1/1995 | Wilden et al. |
| 5,387,943 A | 2/1995 | Silver |
| 5,405,151 A | 4/1995 | Naka et al. |
| 5,446,714 A | 8/1995 | Yoshio et al. |
| 5,446,798 A | 8/1995 | Morita et al. |
| 5,448,687 A | 9/1995 | Hoogerhyde et al. |
| 5,450,504 A | 9/1995 | Calia |
| 5,469,193 A | 11/1995 | Giobbi et al. |
| 5,473,736 A | 12/1995 | Young |
| 5,526,041 A | 6/1996 | Glatt |
| 5,534,917 A | 7/1996 | MacDougall |
| 5,537,638 A | 7/1996 | Morita et al. |
| 5,548,667 A | 8/1996 | Tu |
| 5,550,960 A | 8/1996 | Shirman |
| 5,555,532 A | 9/1996 | Sacha |
| 5,557,684 A | 9/1996 | Wang et al. |
| 5,559,950 A | 9/1996 | Cannon |
| 5,563,989 A | 10/1996 | Billyard |
| 5,572,261 A | 11/1996 | Cooper |
| 5,574,836 A | 11/1996 | Broemmelsiek |
| 5,577,179 A | 11/1996 | Blank |
| 5,577,913 A | 11/1996 | Moncrief et al. |
| 5,586,231 A | 12/1996 | Florent et al. |
| 5,590,248 A | 12/1996 | Zarge et al. |
| 5,598,297 A | 1/1997 | Yamanaka et al. |
| 5,611,000 A | 3/1997 | Szeliski et al. |
| 5,616,078 A | 4/1997 | Oh |
| 5,617,407 A | 4/1997 | Bareis |
| 5,630,033 A | 5/1997 | Purcell et al. |
| 5,631,697 A | 5/1997 | Nishimura et al. |
| 5,647,019 A | 7/1997 | Iino et al. |
| 5,649,032 A | 7/1997 | Burt et al. |
| 5,659,671 A | 8/1997 | Tannenbaum et al. |
| 5,660,547 A | 8/1997 | Copperman |
| 5,668,646 A | 9/1997 | Katayama et al. |
| 5,672,820 A | 9/1997 | Rossi et al. |
| 5,673,374 A | 9/1997 | Sakaibara et al. |
| 5,680,487 A | 10/1997 | Markandey |
| 5,684,887 A | 11/1997 | Lee et al. |
| 5,699,497 A | 12/1997 | Erdahl et al. |
| 5,704,024 A | 12/1997 | Voorhies et al. |
| 5,717,848 A | 2/1998 | Watanabe et al. |
| 5,734,384 A | 3/1998 | Yanof et al. |
| 5,748,865 A | 5/1998 | Yamamoto et al. |
| 5,748,867 A | 5/1998 | Cosman et al. |
| 5,751,928 A | 5/1998 | Bakalash |
| 5,756,354 A | 5/1998 | Tzidon et al. |
| 5,757,360 A | 5/1998 | Nitta et al. |
| 5,760,781 A | 6/1998 | Kaufman et al. |
| 5,761,401 A | 6/1998 | Kobayashi et al. |
| 5,764,803 A | 6/1998 | Jacquin et al. |
| 5,769,718 A | 6/1998 | Rieder |
| 5,774,124 A | 6/1998 | Itoh et al. |
| 5,781,194 A | 7/1998 | Ponomarev et al. |
| 5,786,801 A | 7/1998 | Ichise |
| 5,793,376 A | 8/1998 | Tanaka et al. |
| 5,796,952 A | 8/1998 | Davis et al. |
| 5,798,519 A | 8/1998 | Vock et al. |
| 5,805,170 A | 9/1998 | Burch |
| 5,805,745 A | 9/1998 | Graf |
| 5,805,782 A | 9/1998 | Foran |
| 5,808,617 A | 9/1998 | Kenworthy et al. |
| 5,808,619 A | 9/1998 | Choi et al. |
| 5,812,136 A | 9/1998 | Keondjian |
| 5,812,141 A | 9/1998 | Kamen et al. |
| 5,818,424 A | 10/1998 | Korth |
| 5,818,553 A | 10/1998 | Koenck et al. |
| 5,825,308 A | 10/1998 | Rosenberg |
| 5,831,623 A | 11/1998 | Negishi et al. |
| 5,838,366 A | 11/1998 | Snape et al. |
| 5,852,443 A | 12/1998 | Kenworthy |
| 5,854,632 A | 12/1998 | Steiner |
| 5,856,844 A | 1/1999 | Batterman et al. |
| 5,864,342 A | 1/1999 | Kajiya et al. |

(56) References Cited

U.S. PATENT DOCUMENTS

| | | |
|---|---|---|
| 5,864,742 A | 1/1999 | Gasper et al. |
| 5,870,097 A | 2/1999 | Snyder et al. |
| 5,870,098 A | 2/1999 | Gardiner |
| 5,880,736 A | 3/1999 | Peercy et al. |
| 5,880,856 A | 3/1999 | Ferriere |
| 5,889,505 A | 3/1999 | Toyama et al. |
| 5,890,122 A | 3/1999 | Van Kleeck et al. |
| 5,894,308 A | 4/1999 | Isaacs |
| 5,899,810 A | 5/1999 | Smith |
| 5,903,318 A | 5/1999 | Demay et al. |
| 5,905,894 A | 5/1999 | De Bonet |
| 5,912,830 A | 6/1999 | Krech, Jr. et al. |
| 5,913,727 A | 6/1999 | Ahdoot |
| 5,914,724 A | 6/1999 | Deering et al. |
| 5,915,972 A | 6/1999 | Tada |
| 5,917,937 A | 6/1999 | Szeliski et al. |
| 5,923,318 A | 7/1999 | Zhai et al. |
| 5,923,381 A | 7/1999 | Demay et al. |
| 5,929,860 A | 7/1999 | Hoppe |
| 5,933,150 A | 8/1999 | Ngo et al. |
| 5,933,535 A | 8/1999 | Lee et al. |
| 5,935,198 A | 8/1999 | Blomgren |
| 5,949,424 A | 9/1999 | Cabral et al. |
| 5,953,485 A | 9/1999 | Abecassis |
| 5,959,673 A | 9/1999 | Lee et al. |
| 5,963,209 A | 10/1999 | Hoppe |
| 5,964,660 A | 10/1999 | James et al. |
| 5,966,133 A | 10/1999 | Hoppe |
| 5,977,977 A | 11/1999 | Kajiya et al. |
| 5,982,352 A | 11/1999 | Pryor |
| 5,982,390 A | 11/1999 | Stoneking et al. |
| 5,986,668 A | 11/1999 | Szeliski et al. |
| 5,987,164 A | 11/1999 | Szeliski et al. |
| 5,990,901 A | 11/1999 | Lawton et al. |
| 6,002,738 A | 12/1999 | Cabral et al. |
| 6,009,188 A | 12/1999 | Cohen et al. |
| 6,009,190 A | 12/1999 | Szeliski et al. |
| 6,010,403 A | 1/2000 | Adam et al. |
| 6,016,150 A | 1/2000 | Lengyel et al. |
| 6,018,347 A | 1/2000 | Willis |
| 6,018,349 A | 1/2000 | Szeliski et al. |
| 6,023,523 A | 2/2000 | Cohen et al. |
| 6,026,182 A | 2/2000 | Lee et al. |
| 6,031,934 A | 2/2000 | Ahmad et al. |
| 6,034,691 A | 3/2000 | Aono et al. |
| 6,034,692 A | 3/2000 | Gallery et al. |
| 6,034,693 A | 3/2000 | Kobayashi et al. |
| 6,035,067 A | 3/2000 | Ponticos |
| 6,037,947 A | 3/2000 | Nelson et al. |
| 6,040,842 A | 3/2000 | Wavish et al. |
| 6,044,181 A | 3/2000 | Szeliski et al. |
| 6,046,744 A | 4/2000 | Hoppe |
| 6,049,619 A | 4/2000 | Anandan et al. |
| 6,049,636 A | 4/2000 | Yang |
| 6,058,397 A | 5/2000 | Barrus et al. |
| 6,072,494 A | 6/2000 | Nguyen |
| 6,072,504 A | 6/2000 | Segen |
| 6,081,274 A | 6/2000 | Shiraishi |
| 6,100,898 A | 8/2000 | Malamy et al. |
| 6,101,289 A | 8/2000 | Kellner |
| 6,112,240 A | 8/2000 | Pogue et al. |
| 6,121,953 A | 9/2000 | Walker |
| 6,127,936 A | 10/2000 | Gendel et al. |
| 6,130,673 A | 10/2000 | Pulli et al. |
| 6,137,492 A | 10/2000 | Hoppe |
| 6,141,013 A | 10/2000 | Nelson et al. |
| 6,141,041 A | 10/2000 | Carlborn et al. |
| 6,155,924 A | 12/2000 | Nakagawa et al. |
| 6,157,386 A | 12/2000 | Wilde |
| 6,162,123 A | 12/2000 | Woolston |
| 6,172,354 B1 | 1/2001 | Adan et al. |
| 6,175,367 B1 | 1/2001 | Parikh et al. |
| 6,181,384 B1 | 1/2001 | Kurashige et al. |
| 6,181,988 B1 | 1/2001 | Schneider et al. |
| 6,199,093 B1 | 3/2001 | Yokoya |
| 6,200,138 B1 | 3/2001 | Ando et al. |
| 6,201,581 B1 | 3/2001 | Moriwake et al. |
| 6,203,426 B1 | 3/2001 | Matsui et al. |
| 6,208,347 B1 | 3/2001 | Migdal et al. |
| 6,220,962 B1 | 4/2001 | Miyamoto et al. |
| 6,222,555 B1 | 4/2001 | Christofferson et al. |
| 6,229,553 B1 | 5/2001 | Duluk, Jr. et al. |
| 6,233,291 B1 | 5/2001 | Shukhman et al. |
| 6,252,608 B1 | 6/2001 | Snyder et al. |
| 6,268,875 B1 | 7/2001 | Duluk, Jr. et al. |
| 6,273,814 B1 | 8/2001 | Komoto |
| 6,288,730 B1 | 9/2001 | Duluk, Jr. et al. |
| 6,313,841 B1 | 11/2001 | Ogata et al. |
| 6,313,842 B1 | 11/2001 | Tampieri |
| 6,319,129 B1 | 11/2001 | Igarashi et al. |
| 6,320,580 B1 | 11/2001 | Yasui et al. |
| 6,323,838 B1 | 11/2001 | Thanasack |
| 6,330,000 B1 | 12/2001 | Fenney et al. |
| 6,331,851 B1 | 12/2001 | Suzuki et al. |
| 6,342,885 B1 | 1/2002 | Knittel et al. |
| 6,348,921 B1 | 2/2002 | Zhao et al. |
| 6,353,272 B1 | 3/2002 | van der Hoeven |
| 6,356,263 B2 | 3/2002 | Migdal et al. |
| 6,356,272 B1 | 3/2002 | Matsumoto et al. |
| 6,356,288 B1 | 3/2002 | Freeman et al. |
| 6,361,438 B1 | 3/2002 | Morihira |
| 6,366,272 B1 | 4/2002 | Rosenberg et al. |
| 6,392,647 B1 | 5/2002 | Migdal et al. |
| 6,396,490 B1 | 5/2002 | Gorman |
| 6,400,842 B2 | 6/2002 | Fukuda |
| 6,411,298 B1 | 6/2002 | Goto et al. |
| 6,414,960 B1 | 7/2002 | Kuhn et al. |
| 6,417,836 B1 | 7/2002 | Kumar et al. |
| 6,421,057 B1 | 7/2002 | Lauer et al. |
| 6,426,720 B1 | 7/2002 | Ross et al. |
| 6,426,755 B1 | 7/2002 | Deering |
| 6,456,977 B1 | 9/2002 | Wang |
| 6,476,807 B1 | 11/2002 | Duluk, Jr. et al. |
| 6,488,505 B1 | 12/2002 | Hightower |
| 6,489,955 B1 | 12/2002 | Newhall, Jr. |
| 6,496,189 B1 | 12/2002 | Yaron et al. |
| 6,496,598 B1 | 12/2002 | Harmon |
| 6,504,538 B1 | 1/2003 | Freund et al. |
| 6,529,206 B1 | 3/2003 | Ohki et al. |
| 6,529,875 B1 | 3/2003 | Nakajima et al. |
| 6,538,666 B1 | 3/2003 | Ozawa et al. |
| 6,545,663 B1 | 4/2003 | Arbter et al. |
| 6,554,707 B1 | 4/2003 | Sinclair et al. |
| 6,563,499 B1 | 5/2003 | Waupotitsch et al. |
| 6,571,208 B1 | 5/2003 | Kuhn et al. |
| 6,572,475 B1 | 6/2003 | Okabe et al. |
| 6,573,890 B1 | 6/2003 | Lengyel |
| 6,577,312 B2 | 6/2003 | Deering et al. |
| 6,578,197 B1 | 6/2003 | Peercy et al. |
| 6,585,599 B1 | 7/2003 | Horigami et al. |
| 6,594,388 B1 | 7/2003 | Gindele et al. |
| 6,597,363 B1 | 7/2003 | Duluk, Jr. et al. |
| 6,609,976 B1 | 8/2003 | Yamagishi et al. |
| 6,611,265 B1 | 8/2003 | Hong et al. |
| 6,639,594 B2 | 10/2003 | Zhang et al. |
| 6,639,609 B1 | 10/2003 | Hayashi |
| 6,646,639 B1 | 11/2003 | Greene et al. |
| 6,646,640 B2 | 11/2003 | Nagy |
| 6,650,329 B1 | 11/2003 | Koike |
| 6,652,376 B1 | 11/2003 | Yoshida et al. |
| 6,664,955 B1 | 12/2003 | Deering |
| 6,664,959 B2 | 12/2003 | Duluk, Jr. et al. |
| 6,680,746 B2 | 1/2004 | Kawai et al. |
| 6,686,924 B1 | 2/2004 | Mang et al. |
| 6,714,236 B1 | 3/2004 | Wada et al. |
| 6,717,576 B1 | 4/2004 | Duluk, Jr. et al. |
| 6,717,579 B1 | 4/2004 | Deslandes et al. |
| 6,717,599 B1 | 4/2004 | Olano |
| 6,720,949 B1 | 4/2004 | Pryor et al. |
| 6,738,059 B1 | 5/2004 | Yoshinaga et al. |
| 6,744,442 B1 | 6/2004 | Chan et al. |
| 6,750,867 B1 | 6/2004 | Gibson |
| 6,753,870 B2 | 6/2004 | Deering et al. |
| 6,755,654 B2 | 6/2004 | Hightower |

(56) References Cited

U.S. PATENT DOCUMENTS

| | | |
|---|---|---|
| 6,764,403 B2 | 7/2004 | Gavin |
| 6,771,264 B1 | 8/2004 | Duluk, Jr. et al. |
| 6,771,813 B1 | 8/2004 | Katsuyama |
| 6,778,181 B1 | 8/2004 | Kilgariff et al. |
| 6,781,594 B2 | 8/2004 | Day |
| 6,795,068 B1 | 9/2004 | Marks |
| 6,798,411 B1 | 9/2004 | Gorman et al. |
| 6,803,910 B2 | 10/2004 | Pfister et al. |
| 6,803,964 B1 | 10/2004 | Post et al. |
| 6,807,296 B2 | 10/2004 | Mishima |
| 6,825,851 B1 | 11/2004 | Leather |
| 6,850,236 B2 | 2/2005 | Deering |
| 6,850,243 B1 | 2/2005 | Kilgariff et al. |
| 6,853,382 B1 | 2/2005 | Van Dyke et al. |
| 6,854,632 B1 | 2/2005 | Larsson |
| 6,864,895 B1 | 3/2005 | Tidwell et al. |
| 6,903,738 B2 | 6/2005 | Pfister et al. |
| 6,912,010 B2 | 6/2005 | Baker et al. |
| 6,917,692 B1 | 7/2005 | Murching et al. |
| 6,928,433 B2 | 8/2005 | Goodman et al. |
| 6,956,871 B2 | 10/2005 | Wang et al. |
| 6,962,527 B2 | 11/2005 | Baba |
| 6,995,788 B2 | 2/2006 | James |
| 7,006,101 B1 | 2/2006 | Brown et al. |
| 7,072,792 B2 | 7/2006 | Freifeld |
| 7,079,138 B2 | 7/2006 | Day |
| 7,081,893 B2 | 7/2006 | Cerny |
| 7,085,722 B2 | 8/2006 | Luisi |
| 7,101,284 B2 | 9/2006 | Kake et al. |
| 7,113,193 B2 | 9/2006 | Marks |
| 7,162,314 B2 | 1/2007 | Fay et al. |
| 7,180,529 B2 | 2/2007 | Covannon et al. |
| 7,194,539 B2 | 3/2007 | Hughes et al. |
| 7,214,133 B2 | 5/2007 | Jen et al. |
| 7,233,904 B2 | 6/2007 | Luisi |
| 7,251,315 B1 | 7/2007 | Quinton |
| 7,293,235 B1 | 11/2007 | Powers et al. |
| 7,304,667 B2 | 12/2007 | Watanabe et al. |
| 7,333,150 B2 | 2/2008 | Cooper |
| 7,339,589 B2 | 3/2008 | Annunziata |
| 7,589,723 B2 | 9/2009 | Wang et al. |
| 7,636,126 B2 | 12/2009 | Mallinson |
| 7,777,746 B2 | 8/2010 | Annunziata |
| 7,877,262 B2 | 1/2011 | Luisi |
| 7,880,746 B2 | 2/2011 | Marks et al. |
| 7,916,215 B2 | 3/2011 | Wu et al. |
| 7,920,209 B2 | 4/2011 | Mallinson |
| 7,965,338 B2 | 6/2011 | Chen |
| 8,133,115 B2 | 3/2012 | Campbell |
| 8,204,272 B2 | 6/2012 | Marks |
| 8,243,089 B2 | 8/2012 | Marks et al. |
| 8,284,310 B2 | 10/2012 | Mallinson |
| 8,289,325 B2 | 10/2012 | Green et al. |
| 8,798,401 B1 | 8/2014 | Johnson et al. |
| 10,786,736 B2 | 9/2020 | Weising |
| 2001/0048434 A1 | 12/2001 | Brown |
| 2002/0018063 A1 | 2/2002 | Donovan et al. |
| 2002/0041335 A1 | 4/2002 | Taraci et al. |
| 2002/0047937 A1 | 4/2002 | Wells |
| 2002/0068626 A1 | 6/2002 | Takeda et al. |
| 2002/0080136 A1 | 6/2002 | Kouadio |
| 2002/0107070 A1 | 8/2002 | Nagy |
| 2002/0130866 A1 | 9/2002 | Stuttard |
| 2002/0140703 A1 | 10/2002 | Baker et al. |
| 2002/0162081 A1 | 10/2002 | Solomon |
| 2002/0167518 A1 | 11/2002 | Migdal et al. |
| 2003/0009748 A1 | 1/2003 | Glanville et al. |
| 2003/0043163 A1 | 3/2003 | Day |
| 2003/0045359 A1 | 3/2003 | Leen et al. |
| 2003/0050112 A1 | 3/2003 | Leen et al. |
| 2003/0058238 A1 | 3/2003 | Doak et al. |
| 2003/0104868 A1 | 6/2003 | Okita et al. |
| 2003/0112238 A1 | 6/2003 | Cerny et al. |
| 2003/0117391 A1 | 6/2003 | Olano |
| 2003/0142232 A1 | 7/2003 | Albean |
| 2003/0179220 A1 | 9/2003 | Dietrich et al. |
| 2003/0216177 A1 | 11/2003 | Aonuma et al. |
| 2004/0003370 A1 | 1/2004 | Schenk et al. |
| 2004/0051716 A1 | 3/2004 | Sevigny |
| 2004/0056860 A1 | 3/2004 | Collodi |
| 2004/0100582 A1 | 5/2004 | Stanger |
| 2004/0130550 A1 | 7/2004 | Blanco |
| 2004/0130552 A1 | 7/2004 | Duluk, Jr. et al. |
| 2004/0166935 A1 | 8/2004 | Gavin et al. |
| 2004/0219976 A1 | 11/2004 | Campbell |
| 2004/0263636 A1 | 12/2004 | Cutler et al. |
| 2004/0268413 A1 | 12/2004 | Reid et al. |
| 2005/0001836 A1 | 1/2005 | Day |
| 2005/0019020 A1 | 1/2005 | Sato et al. |
| 2005/0024379 A1 | 2/2005 | Marks |
| 2005/0026689 A1 | 2/2005 | Marks |
| 2005/0078116 A1 | 4/2005 | Sloan et al. |
| 2005/0090302 A1 | 4/2005 | Campbell |
| 2005/0090312 A1 | 4/2005 | Campbell |
| 2005/0243094 A1 | 11/2005 | Patel et al. |
| 2005/0246638 A1* | 11/2005 | Whitten ............... A63F 13/5375 715/708 |
| 2005/0253965 A1 | 11/2005 | Cooper |
| 2006/0015348 A1 | 1/2006 | Cooper et al. |
| 2006/0039017 A1 | 2/2006 | Park |
| 2006/0047704 A1 | 3/2006 | Gopalakrishnan |
| 2006/0071933 A1 | 4/2006 | Green et al. |
| 2006/0209210 A1 | 9/2006 | Swan et al. |
| 2006/0214943 A1 | 9/2006 | Day |
| 2006/0238549 A1 | 10/2006 | Marks |
| 2006/0290810 A1 | 12/2006 | Mallinson |
| 2007/0035831 A1 | 2/2007 | Gutierrez Novelo |
| 2007/0094335 A1 | 4/2007 | Tu |
| 2007/0106760 A1 | 5/2007 | Houh et al. |
| 2007/0168309 A1 | 7/2007 | Tzruya et al. |
| 2007/0191097 A1 | 8/2007 | Johnson |
| 2007/0257928 A1 | 11/2007 | Marks et al. |
| 2007/0279427 A1 | 12/2007 | Marks |
| 2008/0070655 A1 | 3/2008 | Tanabe |
| 2008/0215994 A1* | 9/2008 | Harrison ............... A63F 13/42 715/757 |
| 2008/0268956 A1 | 10/2008 | Suzuki |
| 2008/0268961 A1 | 10/2008 | Brook et al. |
| 2008/0274798 A1 | 11/2008 | Walker et al. |
| 2009/0007186 A1 | 1/2009 | Hartwell |
| 2009/0017908 A1 | 1/2009 | Miyamoto |
| 2009/0040222 A1 | 2/2009 | Green et al. |
| 2009/0063463 A1 | 3/2009 | Turner et al. |
| 2009/0088233 A1* | 4/2009 | O'Rourke ............... A63F 13/12 463/7 |
| 2009/0118015 A1 | 5/2009 | Chang et al. |
| 2009/0131177 A1 | 5/2009 | Pearce |
| 2009/0193453 A1 | 7/2009 | Cansler et al. |
| 2009/0209337 A1 | 8/2009 | Vrignaud et al. |
| 2009/0227368 A1* | 9/2009 | Wyatt ............... A63F 13/5375 463/31 |
| 2010/0029387 A1 | 2/2010 | Luisi |
| 2010/0041475 A1* | 2/2010 | Zalewski ............ A63F 13/5375 463/30 |
| 2010/0053430 A1 | 3/2010 | Mallinson |
| 2010/0179857 A1 | 7/2010 | Kalaboukis et al. |
| 2011/0181776 A1 | 7/2011 | Mallinson |
| 2011/0205240 A1 | 8/2011 | Marks et al. |
| 2011/0249072 A1 | 10/2011 | Marks |
| 2011/0281648 A1 | 11/2011 | Weising |
| 2013/0129142 A1 | 5/2013 | Miranda-Steiner |
| 2014/0087877 A1 | 3/2014 | Krishnan |

FOREIGN PATENT DOCUMENTS

| | | |
|---|---|---|
| CN | 1369849 | 9/2002 |
| CN | 1652063 A | 8/2005 |
| CN | 1806236 A | 7/2006 |
| CN | 1910619 A | 2/2007 |
| CN | 1317666 C | 5/2007 |
| CN | 101198277 A | 6/2008 |
| CN | 101375596 A | 2/2009 |
| CN | 101401081 A | 4/2009 |

(56) References Cited

FOREIGN PATENT DOCUMENTS

| | | |
|---|---|---|
| CN | 101553862 A | 10/2009 |
| CN | 103002960 A | 3/2013 |
| CN | 103706117 A | 4/2014 |
| CN | 103002960 | 11/2016 |
| CN | 103706117 B | 1/2017 |
| CN | 106964155 A | 7/2017 |
| CN | 107491701 A | 12/2017 |
| CN | 106964155 B | 10/2020 |
| CN | 107491701 B | 10/2020 |
| DE | 19905076 A1 | 5/2000 |
| DE | 60235994.508 | 4/2010 |
| EP | 0448411 | 9/1991 |
| EP | 0553973 | 8/1993 |
| EP | 0615386 | 9/1994 |
| EP | 0789296 A1 | 8/1997 |
| EP | 0850673 A1 | 7/1998 |
| EP | 0947948 | 10/1999 |
| EP | 1029569 | 8/2000 |
| EP | 1176559 | 1/2002 |
| EP | 1229499 | 8/2002 |
| EP | 1419481 A2 | 5/2004 |
| EP | 1479421 | 11/2004 |
| EP | 1541207 | 6/2005 |
| EP | 1541208 | 6/2005 |
| EP | 1630754 | 3/2006 |
| EP | 1650706 | 4/2006 |
| EP | 1419481 B1 | 4/2010 |
| EP | 2569063 | 3/2013 |
| EP | 3608003 A1 | 2/2020 |
| FR | 1419481 | 4/2010 |
| GB | 2351637 A | 1/2001 |
| GB | 2411065 | 8/2005 |
| GB | 1419481 | 4/2010 |
| IN | 9902/CHENP/2012 | 4/2014 |
| JP | S59002040 U | 1/1984 |
| JP | S59202779 | 11/1984 |
| JP | S61131110 | 6/1986 |
| JP | H01229393 | 9/1989 |
| JP | H01308908 | 12/1989 |
| JP | H04151780 | 5/1992 |
| JP | H0527779 | 4/1993 |
| JP | H05336540 | 12/1993 |
| JP | H06089342 | 3/1994 |
| JP | H06266854 | 9/1994 |
| JP | 2006301474 | 10/1994 |
| JP | H06301474 | 10/1994 |
| JP | H07160412 | 6/1995 |
| JP | H07253774 | 10/1995 |
| JP | H07271999 | 10/1995 |
| JP | H07334664 | 12/1995 |
| JP | H08112449 | 5/1996 |
| JP | H08155140 | 6/1996 |
| JP | H09047576 A | 2/1997 |
| JP | H09178426 | 7/1997 |
| JP | H09265379 A | 10/1997 |
| JP | H10055454 | 2/1998 |
| JP | H10165649 | 6/1998 |
| JP | H11070273 A | 3/1999 |
| JP | 11179050 | 7/1999 |
| JP | 2000020193 | 1/2000 |
| JP | 2000070546 | 3/2000 |
| JP | 2000137828 A | 5/2000 |
| JP | 2000157724 | 6/2000 |
| JP | 2000311251 | 7/2000 |
| JP | 2000218036 | 8/2000 |
| JP | 2000233072 A | 8/2000 |
| JP | 3384978 | 9/2000 |
| JP | 2000237453 A | 9/2000 |
| JP | 2000338993 A | 12/2000 |
| JP | 2000339491 A | 12/2000 |
| JP | 3244798 | 1/2001 |
| JP | 2001029649 A | 2/2001 |
| JP | 2001198350 | 7/2001 |
| JP | 2002052256 | 2/2002 |
| JP | 2002140705 A | 5/2002 |
| JP | 2002153676 | 5/2002 |
| JP | 2002159749 | 6/2002 |
| JP | 2002177547 A | 6/2002 |
| JP | 2002304637 A | 10/2002 |
| JP | 2001079263 | 3/2003 |
| JP | 3588351 B | 11/2004 |
| JP | 2004321797 A | 11/2004 |
| JP | 2005500629 A | 1/2005 |
| JP | 2005125095 A | 5/2005 |
| JP | 2005125098 | 5/2005 |
| JP | 2006178948 | 7/2006 |
| JP | 3821822 B2 | 9/2006 |
| JP | 3901960 B2 | 4/2007 |
| JP | 2007136215 | 6/2007 |
| JP | 3971380 B2 | 9/2007 |
| JP | 2008165784 | 7/2008 |
| JP | 2008278937 | 11/2008 |
| JP | 4381371 B2 | 12/2009 |
| JP | 2010088694 | 4/2010 |
| JP | 4616330 | 10/2010 |
| JP | 2013528432 | 7/2013 |
| JP | 5889876 B2 | 3/2016 |
| KR | 20000072753 A | 12/2000 |
| KR | 20020065397 | 8/2002 |
| KR | 100606653 | 7/2006 |
| KR | 1020130118209 | 10/2013 |
| KR | 1020170091779 A | 8/2017 |
| KR | 101881787 B1 | 7/2018 |
| TW | 561448 B | 11/2003 |
| TW | 191667 | 3/2004 |
| WO | WO1994018790 | 8/1994 |
| WO | WO1998002223 A1 | 1/1998 |
| WO | WO1998053443 | 11/1998 |
| WO | WO2000010130 | 2/2000 |
| WO | WO2001029768 | 4/2001 |
| WO | WO2001082626 | 11/2001 |
| WO | WO2003017200 | 2/2003 |
| WO | WO2005040900 | 5/2005 |
| WO | WO2006033360 | 3/2006 |
| WO | WO2006041993 | 4/2006 |
| WO | WO2007001633 | 1/2007 |
| WO | WO2008018943 A1 | 2/2008 |
| WO | WO2008058271 A2 | 5/2008 |
| WO | WO2008058271 A3 | 8/2008 |
| WO | WO2011142857 | 11/2011 |

OTHER PUBLICATIONS

European Search Report dated Apr. 2, 2004 in EP Application No. EP02001875.0.
Communication from Examining Division dated May 24, 2007 in EP Application No. 02001875.0.
Communication from Examining Division dated Jun. 17, 2009 in EP Application No. 02001875.0.
Supplementary European Search Report dated Aug. 1, 2006 in EP Application No. 02768608.8.
Mark et al. "Compiling to a VLIW Fragment Pipeline." In Proceedings of 2001 SIGGRAPH/Eurographics Workshop on Graphics Hardware, pp. 47-55. 9 pages.
Arvo, J. "Backward Ray Tracing." In Developments in Ray Tracing, Computer Graphics, Proceedings of ACM SIGGRAPH 86 Course Notes, vol. 12, Aug. 1986. pp. 259-263. Retyped from original. 2 pages.
International Search Report dated Feb. 6, 2006 in PCT Application No. PCT/US2005/035947.
Communication from Examining Division dated Jan. 12, 2007 in EP Application No. 02768608.8.
Communication from Examining Division dated Nov. 12, 2009 regarding Intention to Grant a European Patent in EP Application No. 02768608.8.
Communication from Examining Division dated Mar. 18, 2010 regarding Decision to Grant a European Patent in EP Application No. 02768608.8.
Partial European Search Report dated Jul. 19, 2007 in EP Application No. EP01306264.1.

(56) References Cited

OTHER PUBLICATIONS

European Search Report dated Oct. 12, 2007 in EP Application No. EP01306264.1.
Communication from Examining Division dated Jul. 8, 2008 in EP Application No. 01306264.1.
Communication from Examining Division dated Oct. 16, 2009 in EP Application No. 01306264.1.
Supplementary European Search Report dated Jan. 2, 2014 in EP Application No. 11780949.1.
Communication from Examining Division dated Dec. 22, 2004 regarding European Search Report—Search Not Possible in EP Application No. 04256331.2.
Communication from Examining Division dated Nov. 7, 2008 in EP Application No. 04256331.2.
Communication from Examining Division dated Jul. 27, 2010 in EP Application No. 04256331.2.
International Search Report dated Aug. 7, 2007 in PCT Application No. PCT/US2006/017574.
Communication from Examining Division dated Dec. 22, 2004 regarding European Search Report—Search Not Possible 4 in EP Application No. 04256342.9.
Communication from Examining Division dated Apr. 28, 2006 in EP Application No. 04256342.9.
International Search Report dated Mar. 31, 2011 in PCT Application No. PCT/US2011/023780.
European Search Report dated Aug. 20, 2004 for EP Application No. EP04251842.3.
Communication from Examining Division dated Apr. 28, 2005 in EP Application No. 04251842.3.
Communication from the Examining Division dated Jun. 14, 2006 regarding Summons to Attend Oral Proceedings for EP Application No. 04251842.3.
Communication from Examining Division dated Feb. 1, 2007 regarding Decision to Refuse the Application in EP Application No. 04251842.3.
Office Action dated Jul. 3, 2014 in Chinese Application No. 201180034304.4 filed Jan. 11, 2013.
Final Office Action dated Apr. 7, 2015 in Japanese Application No. 2013-510086 filed Feb. 4, 2011.
Office Action dated Sep. 18, 2015 in Chinese Application 201180034304.4 filed Feb. 4, 2011.
Office Action dated Jan. 29, 2016 in Chinese Application 201310484667.9 filed Oct. 17, 2013, 11 pages.
Office Action dated Apr. 7, 2016 in Chinese Application 201180034304.4 filed Feb. 4, 2011, 4 pages.
Office Action dated Jun. 20, 2016 in Korean Application 10-2012-7032205 filed Feb. 4, 2011, 10 pages.
Notice of Allowance dated Aug. 4, 2016 in Chinese Application 201180034304.4 filed Feb. 4, 2011, 5 pages.
"Notice of Allowance", Chinese Patent Application No. 201310484667.9, dated Sep. 5, 2016, 5 pages.
"Office Action," European Patent Application No. 11780949.1, dated Feb. 13, 2017, 7 pages.
Korean Application No. 10-2012-7032205, "Office Action," dated Dec. 26, 2016, 3 pages [6 pages including translation].
Chinese Application No. 201280033005.3, "Office Action," dated Feb. 28, 2017, 3 pages [5 pages including translation].
"Office Action," South Korea Patent Application No. 1020127032205, dated Apr. 28, 2017, 4 pages [8 pages including translation].
"Office Action," South Korea Patent Application No. 1020177021490, dated Sep. 20, 2017, 5 pages [10 pages including translation].
"Office Action," South Korea Patent Application No. 1020177021490, dated Mar. 30, 2018, 4 pages [8 pages including translation].
"Notice of Allowance," South Korea Patent Application No. 1020177021490, dated May 8, 2018, 2 pages [3 pages including translation].
"Summons," European Patent Application No. 11780949.1, Feb. 14, 2019, 9 pages.
International Search Report dated Dec. 18, 2015 in PCT Application No. PCT/US2015/050908, 11 pages.

International Search Report dated Dec. 11, 2015 in PCT Application No. PCT/US2015/050870, 13 pages.
"Office Action," Brazil Patent Application No. BR1120120289241, dated Aug. 2, 2019, 4 pages.
"Office Action," India Patent Application No. 9585/CHENP/2012, dated Oct. 22, 2019, 6 pages.
"Minutes of Oral Proceeding", European Patent Convention Application No. 11780949.1, Oct. 25, 2019, 4 pages.
"Extended European Search Report," European Application No. 19197482.3, dated Nov. 6, 2019, 10 pages.
"Decision to Refuse," European Patent Convention Application No. 11780949.1, dated Nov. 4, 2019, 16 pages.
"Office Action," China Patent Application No. 201610912795.2, dated Oct. 21, 2019, 5 pages (11 pages including translation).
Aguilera et al. "Impaired Persons Facilities Based on a Multi-Modality Speech Processing System." In Proceedings on Speech & Language Technology, 1993. 4 pages.
Arons, B. "Authoring and Transcription Tools for Speech-Based Hypermedia." In Proceedings of American Voice I/O Society, 1991. 5 pages.
Arons, B. "Hyperspeech: Navigating in Speech-Only Hypermedia." In Proceedings of the Third Annual ACM Conference on Hypertext, ACM, 1991. pp. 133-146.
Bennacef, S.K. "A Spoken Language System for Information Retrieval." In ICSLP, vol. 94, pp. 1271-1274. 1994. 4 pages.
Gauvain et al. "Speech recognition for an Information Kiosk." In Spoken Language, 1996. ICSLP 96. Proceedings. Fourth International Conference on, vol. 2, pp. 849-852. IEEE, 1996.
Gauvain et al. "Spoken Language Component of the MASK Kiosk." In Human Comfort and Security of Information Systems, pp. 93-103. Springer Berlin Heidelberg, 1997. 11 pages.
Gauvain et al. "The LIMSI Continuous Speech Dictation System." In Proceedings of the Workshop on Human Language Technology, pp. 319-324. Association for Computational Linguistics, Apr. 1994. 6 pages.
Gauvain et al. "The LIMSI Continuous Speech Dictation System: Evaluation on the ARPA Wall Street Journal Task." In Acoustics, Speech, and Signal Processing, 1994. ICASSP-94., 1994 IEEE International Conference on, vol. 1, IEEE, 1994, 4 pp.
Goddeau et al. "Galaxy: A Human-Language Interface to On-Line Travel Information." In Third International Conference on Spoken Language Processing. 1994, pp. 707-710.
House, D. "Spoken-Language Access to Multimedia (SLAM): Masters Thesis." Oregon Graduate Inst., Dept. of CS and Eng., 1995. 59 pages.
Lamel et al. "Recent Developments in Spoken Language Systems for Information Retrieval." In Spoken Dialogue Systems—Theories and Applications. 1995, 4 pages.
Language Industry Monitor, "Janet Baker's Optimism." 1992. [retrieved on Oct. 25, 2011]. Retrieved from the Internet: <URL: http://www.lim.nl/monitor/dragon.html>, 2 pages.
Mostow et al. "Towards a Reading Coach That Listens: Automated Detection of Oral Reading Errors." Proc. of the 11th Ntl. Conf. on A.I., 1993, pp. 392-397.
Russell et al. "Applications of Automatic Speech Recognition to Speech and Language Development in Young Children." In Fourth International Conference on Spoken Language, 1996. ICSLP 96. Vol. 1, pp. 176-179. IEEE, 1996. 4 pages.
"Office Action," Brazil Patent Application No. BR1120120289241, dated Mar. 11, 2020, 4 pages [8 pages including translation].
"Notice of Allowance," China Patent Application No. 201610912795.2, dated Jul. 6, 2020, 2 pages (5 pages including translation).
Agui et al. "Computer Graphics." Shokodo Co., Ltd., Jul. 1992, 1st ed., pp. 80-101 (Environment Mapping).
Auslander et al. "Fast, Effective Dynamic Compilation." In ACM SIGPLAN Notices, vol. 31, No. 5, pp. 149-159. ACM, 1996. 11 pages.
Balakrishnan et al. "Exploring Interactive Curve and Surface Manipulation Using a Bend and Twist Sensitive Input Strip." In Proceedings of the 1999 Symposium on Interactive 3D Graphics, pp. 111-118. ACM, 1999. 9 pages.
Balakrishnan et al. "Performance Differences in the Fingers, Wrist, and Forearm in Computer Input Control." In Proceedings of the

(56) References Cited

OTHER PUBLICATIONS

ACM SIGCHI Conference on Human Factors in Computing Systems, pp. 303-310. ACM, 1997. 10 pages.
Balakrishnan et al. "The PadMouse: Facilitating Selection and Spatial Postioning for the Non-Dominant Hand." In Proceedings of the SIGCHI Conference on Human Factors in Computing Systems, pp. 9-16. ACM Press/Addison-Wesley Publishing Co., 1998. 9 pages.
Balakrishnan et al. "Exploring Bimanual Camera Control and Object Manipulation in 3D Graphics Interfaces." In Proceedings of the SIGCHI Conference on Human Factors in Computing Systems, pp. 56-62. ACM, 1999. 8 pages.
Beshers et al. "Generating Efficient Virtual Worlds for Visualization Using Partial Evaluation and Dynamic Compilation." In ACM SIGPLAN Notices, vol. 32, No. 12, pp. 107-115. ACM, 1997. 9 pages.
Blinn et al. "Texture and Reflection in Computer Generated Images." Communications of the Association for Computing Machinery, ACM, Oct. 1, 1976, pp. 542-547, vol. 19, No. 10, New York, NY USA.
Blinn, J.F. "Light Reflection Functions for Simulation of Clouds and Dusty Surfaces." ACM SIGGRAPH Computer Graphics, pp. 21-29, vol. 16, Issue 3, Jul. 1982.
Blinn, J.F. "Models of Light Reflection for Computer Synthesized Pictures." In ACM SIGGRAPH Computer Graphics, vol. 11, No. 2, pp. 192-198. ACM, 1977.
Calvert, J. "SCEE announces EyeToy:Chat." Game Spot, May 5, 2004. [retrieved Jun. 5, 2006]. Retrieved from the Internet: <URL: http://www.gamespot.com/news/6095429.html.>.
Chan et al. "Efficient Partitioning of Fragment Shaders for Multi-pass Rendering on Programmable Graphics Hardware." In Proceedings of the ACM SIGGRAPH/Eurographics Conference on Graphics Hardware. pp. 69-78, 156. Eurographics Association, 2002 (Sarrbrucken, Germany, Sep. 1-2, 2002).
Davenport et al. "Cinematic Primitives for Multimedia." IEEE Computer Graphics and Applications (Aug. 1991), vol. 11, No. 4, pp. 67-74.
Dorsey et al. "Design and Simultaion of Opera Lighting and Projection Effects." In ACM SIGGRAPH Computer Graphics, vol. 25, No. 4, pp. 41-50. ACM, 1991.
European Search Report dated Jul. 27, 2010 in EP Application No. 04256331.2, filed Oct. 14, 2004. 4 pages.
Fernando et al. "The Cg Tutorial: The Definitve Guide to Programmable Real-Time Graphics." Addison-Wesley Longman Publishing Co., Inc. CH. 1 sections 1.2 and 1.4; Appendix C section C.2. 40 pages.
Fitzmaurice et al. "Sampling, Synthesis, and Input Devices." Communications of the ACM, pp. 55-63. Vol. 42, No. 8, pp. 55-63. Aug. 1999.
Foley et al. "Computer Graphics: Principles and Practice." Second Edition in C, Oct. 1996, pp. 721-745.
Shiu et al. "Pose Determination of Circular Cylinders Using Elliptical and Side Projections." In Systems Engineering, 1991. IEEE International Conference on. New York, IEEE, USA. p. 265-268.
Nicewarner et al. Vision-Guided Grasping of a Strut for Truss Structure Assembly. In Intelligent Robotic Systems for Space Exploration, 1992. Proceedings. Fourth Annual Conference on, pp. 86-93. IEEE, 1992.
Gueziec et al. "Simplicial Maps for Progressive Transmission of Polygonal Surfaces." In Proceedings of the Third Symposium on the Virtual Reality Modeling Language ACM, 1998, pp. 25-31, 131, New York, NY, USA.
Hayano et al. "Mesh Simplification Using Edge Operation with Feature Detection." Inf. Proc. Soc. of Japan SIG Technical Report, Feb. 27, 1998, vol. 98, No. 16, pp. 72-76.
Konma, T. "Rendering and Texture: Introduction to CG Creation in the Multimedia Age." Nikkei Bus. Pub., Inc. Nov. 1996, No. 122, pp. 237 (Bump Mapping).

Nilsson, "ID3 Tag Version 2.3.0." ID3v2: The Audience is Informed, Feb. 3, 1999; [retrieved on Oct. 26, 2011]. Retrieved from the Internet: <URL: http://www.id3.org/id3v2.3.0>.
Matsushita, Yasuyuki, "Special Effects: Interobject Reflection Effect: Starting OpenGL Programming with Mesa 3D." Itsutsubachi Res. Co., Ltd., Jan. 2000, vol. 3, No. 1, pp. 148-153. 6 pages.
McCool et al. "Texture Shaders." In Proceedings of the ACM SIGGRAPH/Eurographics Workshop on Graphics Hardware, pp. 117-126. ACM, 1999. 11 pages.
Akenine-Möller et al. "Real-time rendering." 1999, pp. 68-81, A.K. Peters Ltd. 2008.
Nakamura et al. "Adaptive Transmission of Polygonal Patch Datasets Taking into Account Shape and Color Distribution Features." Inf. Proc. Soc. of Japan SIG Technical Report, Sep. 8, 2000, vol. 2000, No. 8, pp. 25-30.
Nayar et al. "Lighting Sensitive Display." ACM Transactions on Graphics, Oct. 2004, vol. 23, No. 4, pp. 963-979, New York.
NVIDIA Corporation, "User Guide CgFX Plug-In for 3ds Max." Nov. 13, 2002, 26 pp.
Palmer et al. "Tile Based Games FAQ." GAMEDEV, Aug. 31, 2000. [retrieved on Oct. 25, 2011]. Retrieved from the Internet: <URL: http://www.ggdn.net/GameDev/3d/BlockGames/article728.asp.htm>.
Peercy et al. "Interactive Multi-Pass Programmable Shading." In Proceedings of the 27th Annual Conference on Computer Graphics and Interactive Techniques, pp. 425-432. ACM Press/Addison-Wesley Publishing Co., 2000. 8 pages.
Phong, Bui Tuong, "Illumination for Computer Generated Pictures." Communications of the ACM, 18(6), pp. 311-317, Jun. 1975.
Pratt, David R., "A Software Architecture for the Construction and Management of Real-Time Virtual Worlds", Disertation, Naval Post Graduate School, Monterey, California, Jun. 1993, pp. 62-67.
Proudfoot et al. "A Real-Time Procedural Shading System for Programmable Graphics Hardware." In Proceedings of the 28th Annual Conference on Computer Graphics and Interactive Techniques, pp. 159-170. ACM, Aug. 2001. 12 pages.
Rushmeier et al. "Extending the Radiosity Method to Include Specularly Reflecting and Translucent Materials." ACM Transaction on Graphics, vol. 9, No. 1, pp. 1-27, Jan. 1990.
Schlick, C. "A Survey of Shading and Reflectance Models." In Computer Graphics Forum, vol. 13, No. 2, pp. 121-131. Blackwell Science Ltd., 1994. 10 pages.
Schlick, C. "A Fast Alternative to Phong's Specular Model." In Graphics Gems IV, Morgan Kaufmann, pp. 385-386, Academic Press Professional, Inc., 1994.
Segen et al. "Gesture VR: Vision-Based 3D Hand Interface for Spatial Interaction." In Proceedings of the Sixth ACM International Conference on Multimedia, pp. 455-464. ACM, 1998.
Pearce, A. "Shadow Attenuation for Ray Tracing Transparent Objects." In Graphics Gems, pp. 397-399. Academic Press Professional, Inc., 1990.
Tang et al. "Blending Structured Graphics and Layout." In Proceedings of the 7th Annual ACM Symposium on User Interface Software and Technology, pp. 167-173. ACM, 1994. 8 pages.
Taylor, Philip, "The MSDN Shader Workshop Application, Part 1." Microsoft Corporation, Mar. 25, 2002. [retrieved on Oct. 26, 2011]. Retrieved from the Internet: <URL: http://msdn.microsoft.com/en-us/library/ms810474(d=printer)>.
Magnenat-Thalmann et al. "Interactive Computer Animation." No. VRLAB-BOOK-2007-003. pp. 182-186. Prentice Hall, 1996.
The PlayStation 2 Books Riding Spirits Official Complete Guide (graphics), Japan, SoftBank Publishing, Sep. 6, 2003, First Edition, 5 pages.
Voorhoies et al. "Reflection Vector Shading Hardware." In Proceedings of the 21st Annual Conference on Computer Graphics and Interactive Techniques, pp. 163-166. ACM, 1994. 4 pages.
Ware et al. "Reaching for Objects in VR: Displays: Lag and Frame Rate." ACM Transactions on Computer-Human Interaction (TOCHI), vol. 1, No. 4, Dec. 1994: 331-356.
White, S. "The Technology of Jak & Daxter." Game Developer's Conference, Mar. 6, 2003, [retrieved on Mar. 29, 2007]. Retrieved from the Internet: <URL: http://www.gamasutra.com/gdcarchive/2003/White_Stephen.ppt>.

(56) References Cited

OTHER PUBLICATIONS

Woo et al. "A Survey of Shadow Algorithms." Computer Graphics and Applications, IEEE 10, No. 6 (1990): 13-32.
Ohashi et al. "A Gesture Recognition Method for a Stick Input System ." Transactions of the Information Processing Society of Japan 40, No. 2 (1999) [retrieved on Mar. 19, 2014]. Retrieved from the Internet: <URL: http://ci.nii.ac.jp/naid/110002764810>. 12 pages.
International Search Report dated Feb. 4, 2003 in PCT Application No. PCT/US2002/026360.

\* cited by examiner

PLACEMENT OF USER INFORMATION IN A GAME SPACE

CROSS-REFERENCE TO RELATED APPLICATIONS

The present continuation application claims the priority benefit of U.S. Non-Provisional patent application Ser. No. 12/777,268 filed on May 11, 2010 and titled, "Placement of User Information in a Game Space," which is hereby incorporated by reference in its entirety.

BACKGROUND OF THE INVENTION

Field of the Invention

The present invention generally relates to interactive game play. More specifically, the present application relates to placement of user-generated content to aid a user with interactive game play.

Description of the Related Art

Improvements in processing power and graphics quality have led to increasingly complex interactive gaming environments. For example, the PlayStation®3's RSX graphics processor allows for freedom of graphics expression in creating next-generation, real-time 3D imagery. Working in tandem with Sony Computer Entertainment Inc.'s Cell Broadband Engine™ Architecture, RSX processor rendered graphics are unparalleled in quality and realism.

Increasingly complex gaming environments have, in turn, resulted in more complex story lines, game play objectives, missions and tasks, and capabilities associated with game play avatars. As a result, interactive game play has become more challenging even for experienced game players. If a game becomes too challenging, however, game players may forsake future game play out of frustration.

To help game players overcome obstacles or achieve goals in a variety of interactive games, various content providers have begun publishing game magazines. These magazines provide game players with a 'walk thru' that tell the reader/game player where to go and what to do in order to 'win' the game or obtain the highest possible score. Hints or suggestions with respect to special moves or avatar capabilities may also be described in these gaming magazines.

While these magazines may be informative, they suffer from a number of drawbacks. If the magazine is not published by an official source (e.g., an official partner of the game developer), the magazine may omit essential information. In some instances, an unofficial magazine may publish incorrect information. Incorrect information may also result from the tendency to rush and publish these magazines concurrently with the release of an interactive game title to allow for concurrent purchase—even if the magazine is published by an official source.

Game players may also discover 'Easter Eggs' or other secrets during the course of game play. These secrets may not be a part of even an official magazine due to the fact that some game design engineers 'slip in' these Easter Eggs without the knowledge of the magazine publisher. Many interactive games also allow for the creation of special moves that may not have initially been conceived of by the game developer. As a result, these special moves are not a part of the game play magazine—official or otherwise—as their development occur after the magazine and associated game has gone to market.

Once game play magazines publish, subsequent editions tend not to be published. The lack of subsequent, updated editions may further the information that may be withheld from game players. Unique game play situations or circumstances may not become apparent until the interactive game is played by a large number of game players. These situations and circumstances may not be addressed in the gaming magazine thereby leaving game players at a loss as to how they may properly address the same.

In contrast, the Internet offers the opportunity for endless publishing and republishing of information. Notwithstanding endless publishing possibilities, websites on the Internet are often decentralized and unorganized. In some instances, there is no 'official website' as game developers may wish for game players to purchase a 'for fee' official magazine rather than access a free on-line website. Additionally, one website may offer one solution for one particular game play situation whereas another website may offer a solution for another situation. In order for a game player to obtain a complete 'walk thru' of a particular interactive game, the user may have to visit multiple websites on the Internet. Since these websites tend to be 'unofficial,' there is often an issue with the veracity or accuracy of the information displayed on these websites.

A further lacking in the aforementioned prior art solutions is the fact that this information—regardless of source, thoroughness, or quality—is that the information lacks contextual relevance. Some game play environments include a variety of 'acts' or 'levels' of game play; these scenes or levels often include a variety of subsidiary 'scenes' or 'stages.' For example, a game based on the D-Day military offensive may involve four scenes: crossing the English Channel; advancing up Omaha Beach; taking artillery positions at the head of the beach; and securing numerous military objectives in the French countryside. Game play advice concerning how to best maneuver an LCM Landing Craft while crossing the English Channel has no value to the game player that currently needs advice on how to best conduct a room-to-room search in the bombed out buildings of the nearby town of Bayeux. Locating the contextually appropriate game play advice may be time consuming if not confusing to a game player in the 'heat of battle.'

The aforementioned prior art game play advice solutions are also wanting for lack of real-time provisioning of information. Many of today's interactive games are incredibly realistic, action-intensive simulations such as Warhawk from Sony Computer Entertainment America Inc. A game player often finds themselves 'in the zone' with respect to game play. If a game player is continually forced to interrupt game play (e.g., 'pausing' the game) in order to flip through pages of a game play magazine or click-thru various pages of content on the Internet, the game player will quickly find themselves losing their rhythm. In such complex game play environments, loss of that rhythm may be to the detriment of continued game play regardless of any hints or information that may have been acquired during the interruption.

Many games are also network or community-based with multiple players located around the country or around the world. Such games may occur in real-time. In certain of these games, the interruption of game play through 'pause' functionality may not be an option as may be available in a single-player game environment. The game player may be forced to drop out of a particular network game because the gaming environment cannot both exist in a timed-out/paused state for one game player yet continue in real-time for all others.

While some network or community-based games may allow for a 'pause' or other 'time out' feature, doing so may be to the detriment of the player invoking the interruption. In some games, for example, other game players may continue to advance through the game play environment by obtaining objects of value or reaching objectives within the environment. In other games, competing and non-paused players may position themselves to take retributive action on the 'paused' game player when they re-enter the gaming environment. For example, a non-paused player may sneak up behind a 'paused' player in a combat environment and assassinate the 'paused' player at point-blank range as the 'paused' player is unable to observe or react to events in the game environment while in a paused state.

There is a need in the art for game play advice that is complete and up-to-date regardless of when a particular interactive gaming title is released. Further, there is a need for game play advice that is pervasive and easily accessible to game players. There is a still further need for game play advice that is contextually appropriate and provided in real-time when such information is needed most.

SUMMARY OF THE INVENTION

Embodiments of the present invention provide a system and methods for placement of user-generated content to aid a user with interactive game play.

A first claimed embodiment of the present invention includes a method for managing user-generated game play advice. An indication of a location within a game space using a virtual coordinate system is received. The location corresponds to the desirability for rendering of game play advice. Game play advice is received from a user and assigned to a location within a game space previously identified as desirous of game play advice by using a virtual coordinate system. Game play advice is then displayed during subsequent game play at the same location within the game space using the virtual coordinate system, the game play advice displayed in a manner that is appropriate with respect to a present context of game play.

A further claimed embodiment of the present invention includes a computer-readable storage medium having embodied thereon a program. The program is executable by a computer to perform a method like that described above.

In a third claimed embodiment, a system for managing user-generated game play advice is described. The system includes a content submission engine for receiving game play advice over a network and a virtual coordinate system engine for assigning the game play advice to a particular location within a game space. A context engine identifies a context of an event during game play. The context of the event corresponds to game play advice associated with the particular location within the game space. A display engine displays game play advice corresponding to the context of the event identified by the context engine and at the location of the event as identified by the virtual coordinate system.

DETAILED DESCRIPTION

The present invention allows for the generation, association, and display of in-game tags. Such tags introduce an additional dimension of community participation to both single and multiplayer games. Through such tags, players are empowered to communicate through filtered text messages and images as well as audio clips that other game players, including top rated players, have generated and placed at particular coordinates and/or in context of particular events within the game space. The presently described in-game tags and associated user generated content further allow for label based searches with respect to game play.

In this context, the elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of particular tasks when executed by a processor, which may be general purpose or application specific. Computer-executable instructions and associated data structures stored in a computer-readable storage medium represent examples of programming means for executing the steps of the methods and/or implementing particular system configurations disclosed herein.

Figure 1:
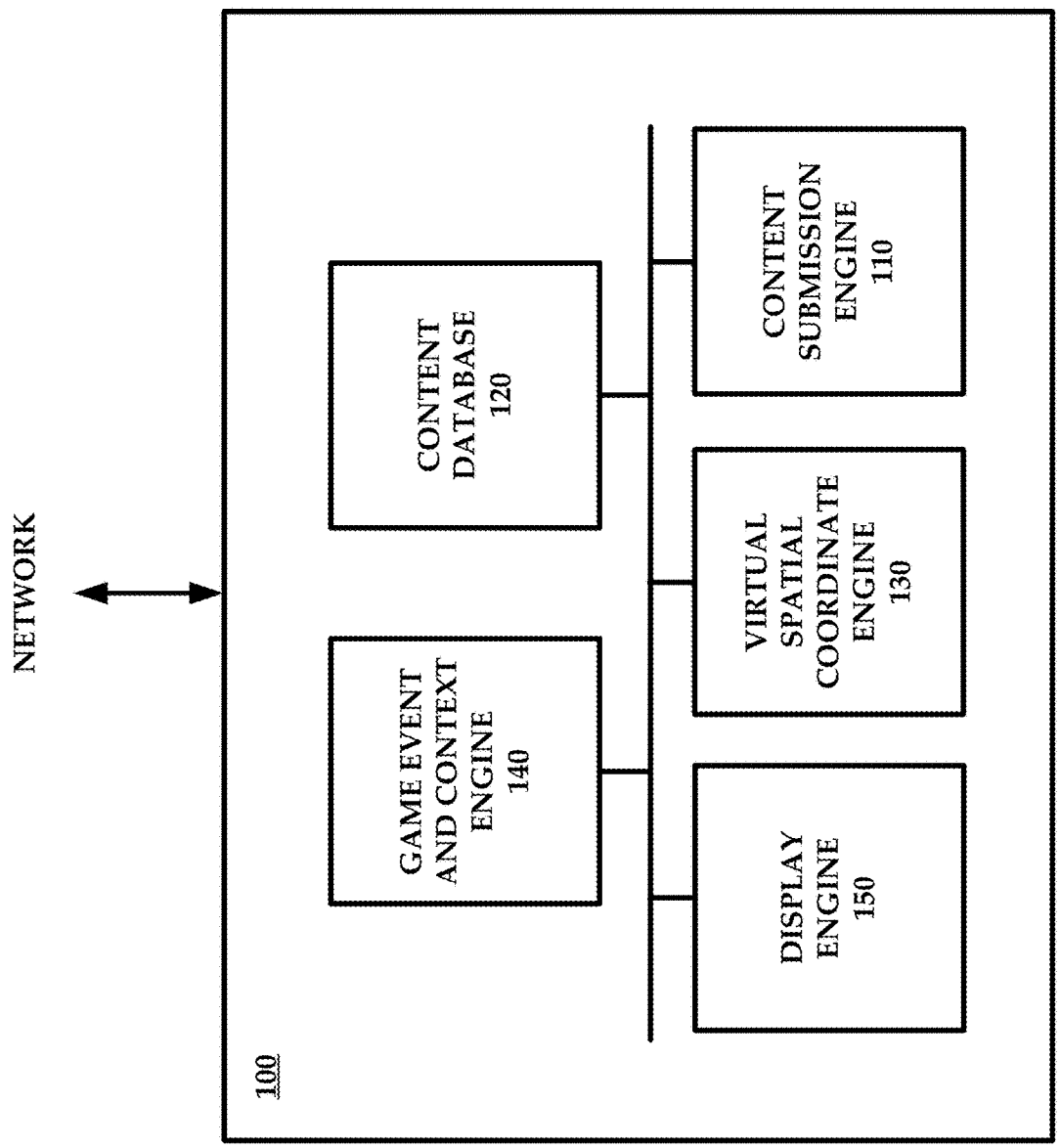
FIG. 1 illustrates an exemplary system for placement of user-generated content to aid a user with interactive game play.

FIG. 1 illustrates an exemplary system 100 for placement of user-generated content to aid a user with interactive game play. The system 100 of FIG. 1 includes a content submission engine 110, content database 120, virtual spatial coordinate (VSC) engine 130, game event and context engine 140, and matching/display engine 150. While various engines and databases are described in the context of FIG. 1, an embodiment of the present invention may offer the functionality of each or certain of these engines and databases in a single 'content management' engine or database.

System 100 may be implemented in a network environment such as the Internet, a proprietary communications environment, or a combination of the two. In one example, system 100 is an integrated component of the PlayStation® Network. System 100 (or components thereof) may communicate with the network environment utilizing any number of network interfaces as are known in the art. Examples of such interfaces include a 1000BASE-T Ethernet port or an IEEE 802.11 b/g network WiFi interface.

System 100 may be implemented in a computing device such as a server dedicated to managing user-generated content including maintenance of various databases. Alternatively, system 100 may be implemented in a computing device hosting a number of applications such as community maintenance, admission, and network game data distribution. System 100 may be dedicated to a single network game, a genre of games, or any number of games having no particular affiliation at all.

System 100 may also be implemented in a distributed peer-to-peer environment. In such an implementation, certain applications and/or responsibilities may be managed by a group of computing devices in the environment.

Various engines may be distributed to a community of users (e.g., players of a particular game or users in a general gaming network) through a push operation from a tasked server in the game community. Alternatively, various engines may be embodied in a computer-readable storage medium that also includes a particular game application (e.g., a disc). Distributed applications and engines may communicate directly via a group of peers or may be administered by a management server.

Content submission engine 110 is executable to allow a user to communicate with the system 100 over network for generation of in-game tags and the corresponding submission of user generated content. In-game tags include custom information placed by a user during game play and can include text messages, web links, images, audio or video clips, and user profile information. In-game tags rely upon virtual space coordinates, which are governed by the virtual spatial coordinate engine 130 and described in further detail below, which allow for consistent positional information pertaining to the game space to be assigned to an in-game tag.

Execution of content submission engine 110 may generate a user-interface for allowing user interaction with the system 100. The interface allows a user to assign user generated information to a particular virtual space coordinate (VSC) and a corresponding tag within the game space. The interface specifically allows for allocation of user generated content as might contemporaneously or previously have been stored in content database 120.

Figure 3:
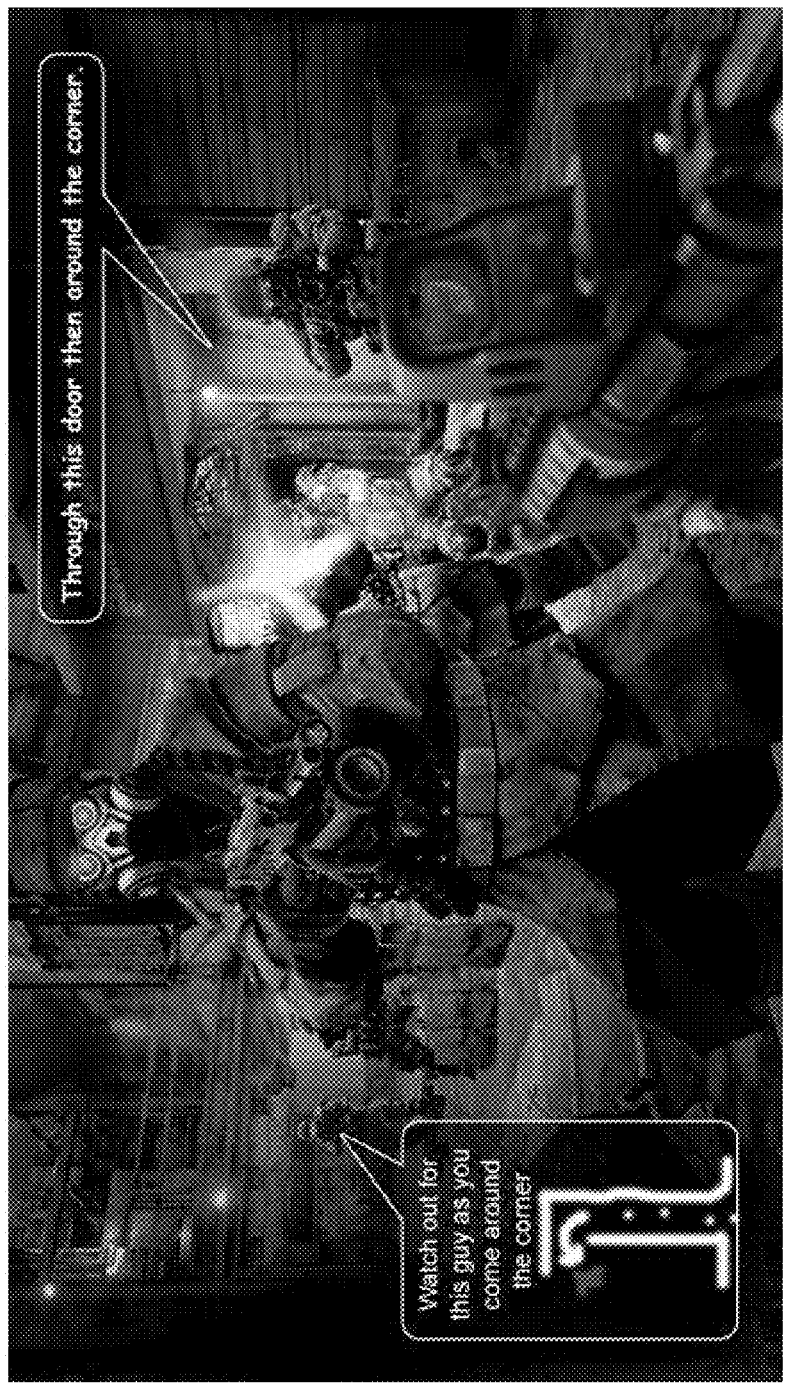
FIG. 3 illustrates a game space including user-generated content.

During game play, a user may navigate a particular portion of a game environment such as a particular passageway as illustrated in FIG. 3. After having played a particular game a number of times, a user might believe that they have particularly useful information to offer other players of the same game such as warnings about enemies entering that passageway or the best way to navigate the passageway and move onto a subsequent game environment. A user might wish to share that information with other game players.

Through depressing a particular button on a control device (or combination of buttons) used in conjunction with game play, a tag is assigned to that particular locale in the game space. Other means of assigning a tag are envisioned including gesture based assignment in those games utilizing motion based or gesture recognition controls. Audio commands may likewise be used to assign a tag in those games utilizing voice commands or having voice recognition capabilities (e.g., 'drop tag' or 'assign tag').

The particular locale in the game space has a VSC, which is the in-game equivalent to a global positioning system location. Through the use of a VSC, and as further described with respect to VSC engine 130, the particular tag will consistently be correlated to that portion of the game space. Whenever another game player (or the same game player) passes by that VSC after the tag has been assigned, the tag and any corresponding information in the content database 120 will be made accessible for review and study.

Content submission engine 110 allows a user to assign user generated information to a tag that was 'dropped' in the game space. It is difficult, if not impossible, to provide detailed information, hints, or other data during the course of game play. The content submission engine 110 provides the interface environment that allows for casual entry of that information following the completion of game play. The content submission engine 110 provides a post-game play listing of all tags that were dropped or assigned during game play and allows the user the means to provide an associated set of information to be stored in or retrieved from content database 120.

Through an interface generated by the content submission engine 110, a user may provide a detailed text message concerning information about the game play environment. The content may further include links to web pages concerning game play, that provide further related information, or information concerning upcoming tournaments, clans, and discussion groups. A tag might also be associated with screen shots or other images related to game play and that might prove useful such as maps or of interest such as 'kill shots.' A tag can also be assigned to audio and video clips generated by a user and that might provide a 'replay' of a particular portion of the game or verbal coaching as to game play. Profile information of the user providing the tag and corresponding user information may also be associated with a tag.

Entry of the game play information may be textual where a user enters a written description of the game play advice (e.g., 'watch out for this guy' or 'through this door' as shown in FIG. 3). Text-entry may occur through a virtual keyboard manipulated by a game controller coupled to a gaming platform. The gaming platform, in turn, is coupled to the system 100 via network. Submission of game play advice may be audible and provided by speaking into a USB microphone headset. Combinations of game play advice submissions are also within the scope of the present invention (e.g., a video clip with audible narration).

In some embodiments, the content submission engine 110 allows the user to re-trace game play and generate tags after the completion of game play. Some games might be so intense that even the act of generating a mere tag might interfere with optimal game play. In such a game, the user can execute the content submission engine 110 after game play is complete and 're-trace' their steps, as the game will have tracked what portions of the environment were and were not accessed during play. The user may then assign tags to particular portions of the game space using a VSC system and the information associated therewith.

Submission of game play advice may also be contextually relevant. As many games are dynamic, especially first-person shooter type games, a particular scenario encountered in a particular environment during one round of game play (e.g., particular enemies) may differ significantly from a subsequent encounter albeit in the exact same game space depending on a particular scenario generated by the game play intelligence. In such an instance, providing a tag indicative of game play advice to a subsequent user when the event giving rise to the tag is not at hand may be distracting and actually detract from effective game play.

Game event and context engine 140 may track these particular nuanced events and, in conjunction with the matching and display engine 150, ensure that only contextually relevant tags are displayed. Information concerning context may be automatically be displayed by the content submission engine 110. Alternatively, a user might identify specific contextually specific limitations during the information provisioning process.

In order to avoid inconsistent naming protocols and that might otherwise complicate presentation of context sensitive game play advice, the content submission engine 110 may indicate that hints related to storming the beach at Omaha in a World War II combat simulation are all provided under the category of 'Omaha Beach' instead of a series of user generated titles such as 'storming the beach,' 'Omaha,' 'chapter II,' and others. The content submission engine 110 may work in conjunction with the game event and context engine 140 with respect to providing naming protocols.

The content submission engine 110 may also allow for user corrections or annotations of game play advice. For example, a previous user might provide information concerning accessing a particular weapon, but erroneously identifies the particular weapon or provides some other contextually inappropriate information. A subsequent user (or users) receiving that contextually inappropriate information may recognize the error or that the information might be better presented in a subsequent stage or area of game play (or simply correct an otherwise minor error). The subsequent user may lodge a complaint or suggest that an entity tasked with quality assurance of game play advice review the submission and/or context of the same.

Content database 120 may store all game play advice received through an interface generated by content submission engine 110. Alternatively, certain game play advice may expire over time or upon the occurrence of certain events. For example, the content database 120 may only retain the top-100 ranked game play advice submissions (as described in further detail herein). Once a particular instance of game play advice falls below a top-100 threshold, that particular instance may be deleted from the content database 120. Expiration may be temporal such that instances of game play advice that are not accessed for a particular period of time are removed from the content database 120. Instances of game play advice may also be removed from the game play advice content database 120 a predetermined number of days after having been submitted to the system 100.

Content database 120 may store all game play advice received through an interface generated by content submission engine 110. Alternatively, certain game play advice may expire over time or upon the occurrence of certain events. For example, the database 120 may only retain the top-100 ranked game play advice submissions (as described in further detail herein). Once a particular instance of game play advice falls below a top-100 threshold, that particular instance may be deleted from the database 120. Expiration may be temporal such that instances of game play advice that are not accessed for a particular period of time are removed from the database 120. Instances of game play advice may also be removed from the game play advice database 120 a predetermined number of days after having been submitted to the system 100.

System 100 may include a ranking engine (not shown) to manage the ranking of game play advice stored in content database 120. As described in co-pending patent publication numbers U.S. 2010-0041475 A1 for "Real-Time, Contextual Display of Ranked, User-Generated Game Play Advice" and U.S. 2009-0063463 A1 for "Ranking of User-Generated Game Play Advice," the disclosures of each being incorporated herein by reference, when new game play advice is received, a ranking engine may assign a default ranking to a new instance of game play advice. This default ranking and any other ranking (including those generated as a result of user feedback) may be measured utilizing any rubric capable of distinguishing one instance of user-generated game play advice from another. In conjunction with a feedback engine and optional weighting engine, both of which are described in the aforementioned publications, the perceived quality of game play advice as adjudicated by a community of users may be more readily identified.

Virtual spatial coordinate engine 130, as noted above, operates as a global positioning system for a particular game space. Depending on the particular layout of the game environment, the VSC engine 130 may identify an X, Y, and (if appropriate) Z coordinate for the game space. This coordinate in the game space is then associated with individual instances of in-game tags such that the tags are consistently provided in the same game space as when they were originally assigned. The VSC engine 130 not only provides consistent presentation of information, but also accurate presentation as more general descriptions such as 'hallway by the door,' 'on the beach,' or 'Level II' as might otherwise be utilized may not provide the specificity required to render useful game play advice. The VSC engine 130 may operate in conjunction with information concerning the rendering and tracking of user information for a particular game title and may thus be agnostic as to any particular game title.

Information concerning VSC data may be provided to the content submission engine 110 to allow for generation of content and matching to in-game tags. VSC data from engine 130 may likewise be provided to content database 120 to allow for proper retrieval and display of user content and in-game tags by matching and display engine 150. VSC data may also be used by game event and context engine 140 to assign proper game context to tags and associated content vis-à-vis the submission engine and the matching/display engine 150.

Game event and context engine 140 is tasked with providing game play advice in an appropriate context of game play such that it may be appropriately displayed by the matching and display engine 150. Content submission engine 110 allows for annotation of appropriate contexts of game play advice by means of an in-game tag. The game event and context engine 140 may identify the context of game play that would be appropriate for game play advice. For example, walking down an alleyway without threats, obstacles, or other encounters that would require tactical game play are not likely to warrant the need for hints or advice. Advancing up the beaches of Normandy on D-Day with heavy gun fire from German forces, obstacles and landmines on the beach, and advancing troops and equipment from the English Channel would clearly require quick and strategic thinking. In this instance, the game event and context engine 140 would, in conjunction with the matching and display engine 150, identify that tags providing game play advice are appropriate and feed that tag information to the display engine 150 such that tags may be displayed and content eventually accessed in content database 120.

A game developer may make initial determinations as to whether a particular task or level will provide certain challenges thus making advice warranted. The game event and context engine 140 may be programmed to correspond to such determinations. Further, the game developer may allow for the introduction of user generated game play advice in those contexts where the game developer provides their own default game play advice; these points may likewise be introduced into the game event and context engine 140. Game developers, too, may study game play feedback in network games with respect to identifying choke points or other areas where particular obstacles might prove to be more challenging in actual game play implementation than those obstacles were during the course of pre-release testing. A game developer may release an update to the game event and context engine 140 over a network that allows for introduction of user advice post-release. The content submission engine 110 may then access the game event and context engine 140 to allow for users to provide this information. These points may be with respect to levels, obstacles, events, enemies, and so forth.

As noted with respect to the content submission engine 110, the game event and context engine 140 may identify certain points of game play related to objects, challenges, or enemies as well as levels or stages as a whole. Game code or other metadata may be flagged with respect to objects or enemies and these flags may be recognized by the game event and context engine 140 upon execution of the game code by a gaming system or processing device. These flags or metadata may be tied to allowing for entry of game play advice. For example, in a World War II simulation, a player might be crossing a field. The field, without any enemies present, may not warrant the need for game play advice—submissions or providing of the same. Later in that same game environment (the field) a tank may enter the scene and begin firing upon the game player. With the introduction of the tank, providing or receiving game play advice may now be warranted. For the tank to appear in the scene would require the execution of code related to the tank. The code for introducing and intelligently controlling the tank by the game platform may be flagged or identified by the aforementioned metadata. Once that flagged code or metadata is recognized by the game event and context engine 140, a user may provide advice or receive the same.

The game event and context engine 140, in this regard, is not only responsible for identifying those points or instances of game play where a user may provide advice, but also those instances where providing advice is appropriate. For example, in the previously mentioned alleyway example, no challenges are present thus making the introduction of advice by the system inappropriate or unnecessary. Should a sniper suddenly begin firing upon the game player, then advice on how to deal with the sniper may be appropriate for the user to consider. The game event and context engine 140 may recognize that providing information related to the sniper is appropriate based on the game platform loading flagged code related to the sniper. Similar provisioning of advice may occur with respect to encountering objects and the like. The game event and context engine 140 may be tied to the game play advice display engine 150 to allow for timely and contextually appropriate display of that advice.

Game play advice display engine 150 is configured to allow for the eventual display of user-generated game play advice via in-game tags and VSC data. Display of this advice may be in further accordance with a ranking result generated by a ranking engine and in further consideration of determinations made by the game event and context engine 140. Game play advice display engine 150 acquires information from the game play advice content database 120 (the advice) and a ranking database (if appropriate), which has ranked game play advice as determined by a ranking engine, and displays the game play advice (or makes available the game play advice) in accordance with the VSC data from engine 130 as well as the game event and context engine 140's determination that the display of advice related to a particular in-game tag and aspect of game play is appropriate.

By working in conjunction with the game event and context engine 140, the display engine 150 may display the highest ranked information but do so in the most appropriate context. For example, displaying information about a particular enemy may be inappropriate when the user has not encountered that enemy notwithstanding the fact that the user providing the information previously encountered that enemy at the same VSC coordinates.

The display engine 150 may utilize an asynchronous programming language to provide real-time (or substantially near real-time) updates to ranked game play advice for display to a community of users. The display engine 150 may, therefore, utilize a ladder ranking of game play advice with respect to determining which in-game tags to display. In such an embodiment, the highest quality advice is presented as that advice ranks at the top of a ladder. In some embodiments, the particular arrangement of the advice as it corresponds to a given tag may be subject to user or system preferences such as particular tags searched by a user or identified as being desirable by a user.

For example, a user may consistently experience difficulty using a particular weapon during game play (e.g., a sniper rifle). Prior to game play, a user seeking advice may, through a corresponding search engine or other interface, inform system 100 that only those in-game tags and corresponding advice with respect to user of the sniper-rifle is wanted. In this manner, the user is not inundated with data concerning the use of grenades, hand guns, and rocket launchers—all weapons with which the user might be quite prolific and for which advice is not needed.

Similar searching and screening of tags may be used with respect to advice from particular users or particular clans. This information may be derived from profile information provided during tag and advice generation. In some instances, a user providing game play advice may limit the accessibility of that advice to a limited number of users. A user wishing to access device from a particular providing user may need to have been identified in advance of in-game tag access or otherwise provide a password or some indicia indicating that they are authorized to access in-game tags and corresponding advice generated by a particular user.

Display engine 150 may display advice in the context of a real-world virtual environment and/or a first- or third-person avatar. Game play advice may be expressly provided via an in-game tag as shown in FIG. 3. Game play advice may also be provided through a series of hyperlinks provided through the tag. Graphic images may also be utilized, especially in the context of game play advice that incorporates full motion video or still images. Links to audio files may be appropriate in the case of audio-rendered advice. All of the aforementioned means of providing game play advice to a community of users (and in accordance with an assigned default or feedback controlled ranking) may be managed by the display engine 150 and the game event and context engine 140.

Figure 2:
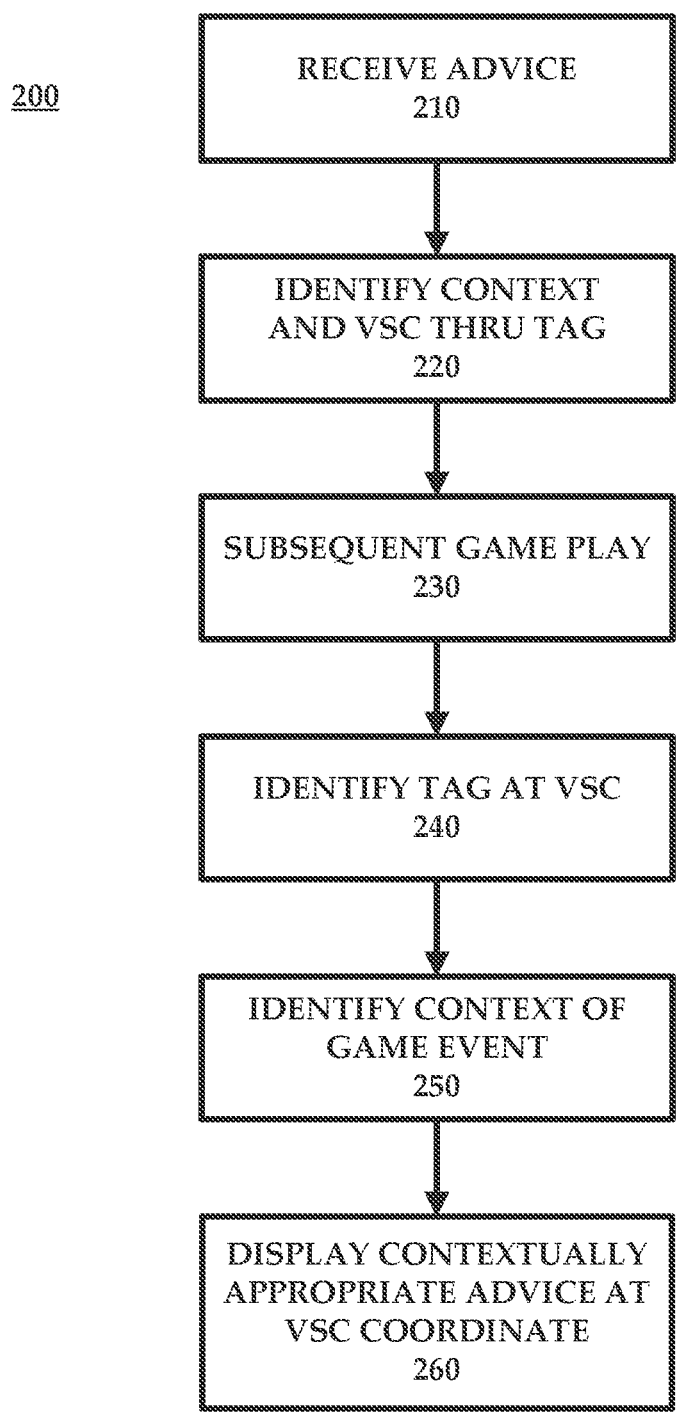
FIG. 2 illustrates an exemplary method for receipt and subsequent display of user-generated game play advice using in-game tags.

FIG. 2 illustrates an exemplary method 200 for receipt and subsequent display of user-generated game play advice using in-game tags. The steps identified in FIG. 2 (and the order thereof) are exemplary and may include various alternatives, combinations, equivalents, or derivations thereof including but not limited to the order of execution of the same. The steps of the process of FIG. 2 (and its various alternatives) may be embodied in hardware or software including a computer-readable storage medium (e.g., optical disc, memory card, or hard drive) including instructions executable by the processor of a computing device.

In step 210, user-generated game play advice is received from a user in the community via an interface generated by the content submission engine 110. Upon receipt of the user-generated advice in step 210, the advice is processed by the system 100 as described in the context of FIG. 1 and stored in game play advice content database 120. Various rankings may also be assigned.

In step 220, the user-generated game play advice, which is associated with a tag, is assigned a particular context either by the user submitting the advice or by the game event and context engine 140 as well as being matched with a given tag using VSC coordinates. In some instances, the game event and context engine 140 may control the available contexts that a user assigns to the advice. In other instances, the game event and context engine 140 may make a determination as to the specific context of advice.

Following subsequent game play (230), the same or a different game player may be navigating a particular game space. A previously generated tag may be identified by means of VSC coordinates at step 240 (i.e., a tag exists as to some particular game play advice at this particular locale in the game space). The context of a game event is then identified in step 250. Identification step 250 occurs as a result of the joint operation of the game event and context engine 140 and display engine 150 and may be similar to identification of an initial context of game play advice as occurs in the context of step 230 (but not otherwise displayed in FIG. 2). Upon a particular context being identified in an environment and that corresponds to a particular VSC, then advice that is relevant to that particular context is identified. That advice is rendered in conjunction with display engine 150 at step 260. The display of advice may take into account user rankings and/or user defined search tags or other limitations.

The method 200 of FIG. 2 may operate in real-time (or substantially in real-time) using an asynchronous programming language. Through the use of an asynchronous language, small amounts of data may be continually exchanged with a database so that an entire user interface need not be reloaded in response to each user interaction. In such an embodiment, an XMLHttpRequest object may, for example, be utilized to fetch the most recent, contextually, and locally relevant game play advice from database 120 as referenced in FIG. 1. Relationships between rankings, user feedback, context, and game play advice may be reflected by metadata or header data stored in the various databases of system 100. Game play advice rankings and context determinations may thus be updated as feedback is received and new rankings are calculated.

Updating of information displayed in FIG. 2 may also operate subject to a predetermined schedule. For example, a ranking engine may update rankings via user feedback at five minute intervals (or any other time period as may be determined by a system administrator). Similar updates may occur with respect to context. Once an update is complete as a result of a regularly scheduled ranking operation, the newly updated information may be pushed to the display engine 150 for display to the community of users in conjunction with appropriate VSC coordinates and context. The updated information may also be available for access in response to a user request or query.

While the present invention has been described with reference to exemplary embodiments, it will be understood by those skilled in the art that various changes may be made and equivalents may be substituted for elements thereof without departing from the true spirit and scope of the present invention. Various alternative systems may be utilized to implement the various methodologies described herein and various methods may be used to achieve certain results from the aforementioned systems.

What is claimed is:

1. A computer-implemented method for providing only contextually relevant user-generated game play advice for a location within a dynamic game, the method comprising:
   executing, by a processor, instructions stored in a memory to:
   receive an indication of the location within a game space;
   receive the user-generated game play advice for a first location from a user;
   determine a first scenario generated by the dynamic game that corresponds to the user-generated game play advice for the first location;
   assign the user-generated game play advice to the first location specifically for the first scenario generated by the dynamic game within the game space;
   during subsequent game play, determine:
      the subsequent game play's location within the game space; and
      the subsequent game play's scenario at the subsequent game play's location; and
   in response to the subsequent game play being at the first location within the game space, automatically display at the first location any of the user-generated game play advice.

2. The computer-implemented method of claim 1, further comprising retracing the user-generated game play advice upon which game play is based, the user-generated game play advice retraceable by the user after completion of the game play for revising or adding to the user-generated game play advice.

3. The computer-implemented method of claim 1, wherein the user-generated game play advice is displayed in a three-dimensional virtual environment.

4. The computer-implemented method of claim 3, wherein a virtual coordinate system uses X, Y, and Z coordinates.

5. The computer-implemented method of claim 1, wherein the user-generated game play advice is textual.

6. The computer-implemented method of claim 1, wherein the user-generated game play advice is visual.

7. The computer-implemented method of claim 1, wherein the user-generated game play advice is audible.

8. The computer-implemented method of claim 1, wherein automatically displaying the user-generated game play advice includes a consideration of a ranking of all available game play advice, and wherein only game play advice of a particular ranking is displayed at the first location and with respect to a present context of game play, the user-generated game play advice further allowing for corrections to be made by the user.

9. A system for providing only contextually relevant user-generated game play advice for a location within a dynamic game, the system comprising:
   a processor; and
   a memory communicatively coupled with the processor, the memory storing instructions which when executed by the processor perform a method, the method comprising:
   receiving the user-generated game play advice over a network from a user;
   assigning the user-generated game play advice to the location within the game space;
   identifying a first scenario generated by the dynamic game that corresponds to the user-generated game play advice for a first location, and assigning the user-generated game play advice to the first location specifically for the first scenario generated by the dynamic game within the game space;
   during subsequent game play, determining:
      the subsequent game play's location within the game space; and
      the subsequent game play's scenario at the subsequent game play's location; and
   in response to the subsequent game play being at the first location within the game space, automatically displaying at the first location any of the user-generated game play advice.

10. The system of claim 9, wherein the method further comprises affecting, via a ranking engine, the user-generated game play advice displayed by a display engine notwithstanding a context of an event and a location of the event.

11. The system of claim 10, wherein the method further comprises receiving, via a feedback engine, feedback from a community of users with respect to a quality of the user-generated game play advice displayed by the display engine, wherein the feedback engine and the ranking engine operate to allocate a new ranking to the user-generated game play advice in accordance with the feedback received from the community of users, the user-generated game play advice being subsequently displayed by the display engine in accordance with the new ranking.

12. The system of claim 10, wherein the display engine operates using an asynchronous programming language to continually update displayed game play advice submissions in accordance with a most recent determination as to the context of the event.

13. A method for providing only contextually relevant user-generated game play advice for a location within a dynamic game, the method comprising:
  receiving an indication of a location within a game space;
  receiving game play advice from a user;
  recognizing metadata associated with objects, challenges or enemies in game play at the location that indicates that user-generated advice is allowed;
  assigning the user-generated game play advice to the location within the game space and assign the user-generated game play advice a tag based upon the recognized metadata; and
  automatically displaying game play advice during subsequent game play at the location within the game space.

14. The method of claim 13, further comprising retracing the user-generated game play advice upon which the game play is based, the user-generated game play advice retraceable by the user after completion of the game play for revising or adding to the user-generated game play advice.

15. The method of claim 13, wherein the user-generated game play advice is displayed in a three-dimensional virtual environment.

16. The method of claim 15, wherein a virtual coordinate system uses X, Y, and Z coordinates.

17. The method of claim 13, wherein the user-generated game play advice is textual.

18. The method of claim 13, wherein the user-generated game play advice is visual.

19. The method of claim 13, wherein the user-generated game play advice is audible.

* * * * *